United States Patent [19]

Dunn, Jr.

[11] 4,355,008

[45] Oct. 19, 1982

[54] CHLORINATION PROCESS

[75] Inventor: Wendell E. Dunn, Jr., Spearfish, S. Dak.

[73] Assignee: Reynolds Metals Company, Richmond, Va.

[21] Appl. No.: 255,553

[22] Filed: Apr. 20, 1981

[51] Int. Cl.$^3$ .................... C01G 35/00; C01G 33/08; C01F 7/56; C01G 49/10
[52] U.S. Cl. .................................... 423/79; 423/74; 423/135; 423/136; 423/343; 423/149; 423/463; 423/500; 423/504
[58] Field of Search ............... 423/111, 133, 135, 136, 423/496, 463, 500, 504, 74, 79, 343

[56] References Cited

U.S. PATENT DOCUMENTS

| | | | |
|---|---|---|---|
| 1,528,039 | 3/1925 | Wolcott | 423/135 |
| 1,600,216 | 9/1926 | Dearborn | 423/136 |
| 1,605,098 | 11/1926 | Dearborn | 423/136 |
| 1,875,105 | 8/1932 | Muggleton et al. | 423/136 |
| 1,982,194 | 11/1934 | Broden et al. | 423/136 |
| 3,627,483 | 12/1971 | Cole et al. | 423/135 |
| 3,865,920 | 2/1975 | Dunn | 423/74 |
| 3,887,694 | 6/1975 | Dunn | 423/504 |

FOREIGN PATENT DOCUMENTS

| | | | |
|---|---|---|---|
| 713192 | 8/1954 | United Kingdom | 423/111 |
| 470499 | 8/1972 | U.S.S.R. | 423/111 |

Primary Examiner—Herbert T. Carter
Attorney, Agent, or Firm—Lyne, Girard & McDonald

[57] ABSTRACT

There is described a method for producing alumina from a material containing alumina values via a chlorination step which process comprises the steps of:

(A) dehydrating the material, if necessary, at a temperature of between about 500 and about 1300° K;
(B) chlorinating the product of step (A) in the presence of chlorine and carbon at a temperature below about 1200° K and under conditions which provide chlorination of a majority of the iron present in the clay without substantial chlorination of titania values which may be present therein with concommittant formation of an iron chloride cloud above the surface of the chlorination reaction mixture;
(C) introducing oxygen into the iron chloride cloud under conditions to cause oxidation of a majority of the iron chloride contained in the cloud;
(D) chlorinating the non-gaseous product of step (B) in the presence of chlorine and carbon at a temperature above about 1300° K but below the fusion temperature of silica containing components and under conditions sufficient to chlorinate substantially entirely the alumina, titania and silica values contained therein;
(E) reducing and condensing any iron chloride contained with the aluminum chloride in one or more iron chloride condensation stages;
(F) absorbing the aluminum chloride under high temperature conditions with an alkali chloride or mixture of alkali chlorides to form an ionic alkali aluminum chloride complex;
(G) selectively condensing the product of step (F) to produce a purified alkali metal/aluminum chloride comples;
(H) hydrolysing the alkali metal/aluminum chloride complex with steam to produce alumina and hydrochloric acid.

2 Claims, No Drawings

CHLORINATION PROCESS

FIELD OF THE INVENTION

This invention pertains to a process for making alumina from aluminum value containing materials such as bauxite, clay, fly ash etc. through an intermediate aluminum chloride step followed by hydrolysis of the chloride to make alumina and oxidation of the hydrochloric acid formed to provide chlorine for recycle.

BACKGROUND OF THE INVENTION

Although processes analogous to the chlorination of ilmenite or rutile to make titanium tetrachloride with subsequent oxidation to make titanium dioxide and recycle chlorine using bauxite, clay or other aluminous materials have been proposed frequently, there is no present commercial operation embodying this cycle. Though it is necessary to have a fine, uniform and well-controlled pigment particle size for titania pigment, the need for aluminas of similar particle size, or particle sizes resulting from oxidation is not evident. Either aluminas of high surface area currently in use, or aluminas of negligible surface area, but of easily handled particle size, would be desired from the oxidation cycle proposed.

In order to produce aluminas similar to those currently in use in some aluminum pot-lines, it is necessary to hydrolyse the aluminum chloride produce from the chlorination of aluminous ores. Although this has the disadvantage of making HCl which is not directly usable for recycle of chlorine values, it is possible to convert hydrogen chloride into chlorine, though at an economic penalty. The amount of oxygen necessary to convert aluminum chloride to chlorine is the same whether a direct oxidation route is taken or the HCl route is taken. Although there are several ways to convert HCl to chlorine, including the non-oxidative Uhde electrolysis and the more recently developed Kel-Clor process as well as the traditional Deacon process, none of these are particularly compatible with the high temperature chlorination techniques which produce aluminum chloride.

Other approaches to alumina production through the hydrated chloride route have and are currently being investigated. These lead to the hydrolysis of hydrated aluminum chloride, need additional excessive amounts of heat and require the extensive equipment investment accompanying any leaching process used to open minerals. It is to avoid slow and high volume processes that the high temperature chlorination techniques were developed. Chloride processes have found success and such concepts have been used in the titanium pigment industry since about 1950. The future of the aluminum industry is thought by many to be dependent not only upon the replacement of high grade bauxites with lower grades (highly siliceous) or with clay and other aluminum sources but upon reduction of the electrical power requirement by substituting aluminum chloride for aluminum oxide in the reduction stage with the elimination of fluorides as well.

OBJECTS OF THE INVENTION

It is an object of this invention to produce aluminum chloride via a high temperature chlorination of aluminum value containing materials, then to produce alumina (with characteristics similar to products of the Bayer process) from this aluminum chloride.

It is an object of this invention to recycle (by HCl oxidation to chlorine) chlorine values from an aluminum chloride production process, which values have been converted to hydrogen chloride in the hydrolysis process.

It is yet another object of this invention to provide a technique to oxidize hydrogen chloride in a cyclic chlorination process compatible with the chlorination techniques used in opening the mineral.

And it is a further object of this invention to provide a chlorination-oxidation cycle which will convert other impurity chlorides to chlorine by an oxidation route including recapture of chlorine values lost to the chlorination of water.

This last feature enables the preheating and drying of the aluminum value containing materials to be less extensive than in processes where any hydrogen in the feed yields a permanent chlorine loss and an environmentally harmful disposal problem. The less extensive drying and preheating of the raw materials enables the ore feed to be at lower temperature with attendent benefits to the retention of internal surface area and reactivity with the chlorinating agents.

As a consequence of the aforementioned advantages of reduced preheating and drying requirements and increased reactivity, the chlorination stage may be operated at lower temperature with reduced energy requirements for heat balance and reduced energy losses in the subsequent cooling and condensation stages.

It is a further feature of this invention that the process described will obviate the necessity of carbon deposition upon the aluminous ore, as in the Alcoa Process (see for example, U.S. Pat. Nos. 3,811,916 and 3,842,163), and will provide a feed which can be chlorinated with a second solid phase of carbon yielding a high $CO_2/CO$ ratio and heat balance without additional heat being added to the reaction. The lowered reactor temperature allowed by the increased reactivity further reduces the heat transfer necessary to bring the chorinator exit gases to the condensation point.

It is yet another object of this invention to reduce the amount of iron chloride present in the gas phase with aluminum chloride which will reduce the amount of iron chloride aluminum chloride complex which forms upon condensation and to recover the chlorine values from such complexes as are formed.

It is a further object of this invention to condense the aluminum chloride under conditions where its purity with respect to iron is sufficient to allow its use without rectification in a subsequent step and a further object to condense the aluminum chloride in the form of an alkali chloride complex at high temperature so as to reduce the titanium and silicon tetrachloride to an acceptable impurity level without further purification stages.

It is an object of this invention to allow the use of a gaseous reducing agent to reduce ferric chloride in the aluminum chloride containing gas stream to facilitate iron chloride impurity removal and it is a further object of this invention to use a gaseous reducing agent to allow recapture of chlorine values escaping from the chlorinator bed.

SUMMARY OF THE INVENTION

The instant process provides a method for producing alumina from a material containing alumina values via a chlorination step which process comprises the steps of:

(A) dehydrating the material, if necessary, at a temperature of between about 500° and about 1300° K.;

(B) chlorinating the product of step (A) in the presence of chlorine and carbon at a temperature below about 1200° K. and under conditions which provide chlorinating of a majority of the iron present in the clay or other aluminum ore without substantial chlorination of titania values which may be present therein with concommittant formation of an iron chloride cloud above the surface of the chlorination reaction mixture;

(C) introducing oxygen into the iron chloride cloud under conditions to cause oxidation of a majority of the iron chloride contained in the cloud;

(D) chlorinating the non-gaseous product of step (b) in the presence of chlorine and carbon at a temperature above about 1300° K. but below the fusion temperature of silica containing components and under conditions sufficient to chlorinate substantially entirely the alumina, titania and silica values contained therein;

(E) reducing and condensing any iron chloride contained with the aluminum chloride in one or more iron chloride condensation stages;

(F) absorbing the aluminum chloride under high temperature conditions with an alkali chloride or mixture of alkali chlorides to form an ionic alkali aluminum chloride complex;

(G) selectively condensing chlorides contained in the product of step (F) to produce a purified alkali metal/aluminum chloride complex;

(H) hydrolysing the alkali metal/aluminum chloride complex with steam to produce alumina and hydrochloric acid.

The instant process converts an aluminum value containing material, for example clay, bauxite, fly ash, etc. of fluidizable particle size, to aluminum chloride and other impurity chlorides in two chlorination stages. Preheated and partially dried feed is first subjected to a chlorination in the presence of carbon which removes a major portion of the iron impurity without significant chlorination of alumina. The feed is then further chlorinated completely, or to practical exhaustion of its alumina content in a second chlorination stage at equal or higher temperature.

The products of this second chlorination are condensed after reduction of the ferric chloride produced to ferrous chloride by iron powder or other reductant, e.g.: hydrogen containing gas. The first condensate is ferrous chloride and its aluminum chloride complex. This is followed by condensation of a fraction of the aluminum chloride produced which is recycled to the second chlorinator either below or above the bed or both. The remaining gaseous aluminum chloride, the product of the process, is then absorbed to form a complex with an alkali metal chloride such as sodium tetrachloro aluminate which forms quickly by the contact of salt with the gaseous aluminum chloride dimer. This liquid complex is then separated from the gaseous stream which contains the low boiling impurities.

The aluminum chloride-salt complex is hydrolysed by steam to make an alumina which is a substitute for Bayer process alumina. The hydrogen chloride produced in the hydrolysis is absorbed in water to form hydrochloric acid and subsequently reacted with recycled ferric oxide to form aqueous ferric chloride. This solution is dehydrated in the presence of an alkali chloride to form the alkali metal tetrachloro ferrate which is subsequently oxidized at moderate temperatures to produce gaseous chlorine and ferric oxide which is recycled to react with the hydrochloric acid. The alkali metal chloride is also recycled. The other impurities (e.g.: silicon and titanium tetrachlorides), can be sold as by-products, or may be hydrolysed and the resulting hydrogen chloride combined with the aluminum chloride hydrolysis HCl to recover the chlorine values.

The chlorination stages are conventional high temperature fluidized bed chlorinators which use solid carbon as the reductant and operate at temperatures in excess of 750° C. to produce the metal chlorides as vapors which are later condensed and/or absorbed. Heat balances are maintained by oxygen combustion of coke.

The oxidation of the alkali tetrachloro ferrate is accomplished in a high shear oxidizer of moderate temperature as described in copending application U.S. Ser. No. 255,550 filed Apr. 20, 1981 concurrently herewith in the name of Wendell E. Dunn, Jr. and entitled "Three Phase Reactor" or U.S. Pat. No. 3,376,112. The separation of gas and solids are by conventional methods and the recycle of the solid $Fe_2O_3$ and NaCl or KCl to the dissolution stage provides the tetrachloro ferrate in solution.

The dehydration of the solution can be accomplished by direct contact with heated gases or by other more conventional heat transfer means using materials not subject to corrosion at dehydration temperatures.

Where chlorides are withdrawn from the system, e.g.: the sale of titanium tetrachloride which is a valuable by-product, the chlorine make-up may be either waste hydrochloric acid, ferric chloride (pickle liquor) or even salt using sulfuric acid to generate hydrogen chloride. This alleviation of the process dependence upon chlorine is of particular interest where the process is employed in remote areas which are without a local source of chlorine (which cannot be shipped in bulk by ocean transport).

In the drying and preheating stages of the process, the feed may be freed from moisture and combined water (as hydroxyls) in stages to achieve heat economy. The final product may be preheated to a temperature sufficient for heat balance without regard to the hydrogen content (hydroxyls) so that the extensive internal surface area can be preserved. Any hydrogen chloride from the chlorination stages can be recovered from the tail gas by water scrubbing while making the exhausted gases environmentally acceptable.

The increased surface area allows the carbon monoxide generated in the primary chlorination reaction of chlorine and carbon to be eliminated by a secondary reaction of carbon monoxide and chlorine with the internal surface of the aluminous feed. This will reduce the carbon monoxide produced in the overall reaction to a negligible amount.

In practice the feed and carbon are fed into a multistage dryer which is supplied with oxygen enriched air to the individual stages. Fluidization is employed primarily because in the subsequent steps of the process it is the mode of gas solid contact. The solids may also be dried in a kiln operation.

After drying and preheating, the solids are introduced into the first chlorination stage where a major proportion of the iron is removed. Chlorination in this stage is conducted so that titanium and silicon are not substantially chlorinated. Solids transfer can be accomplished by methods disclosed in U.S. Pat. No. 3,105,736.

The first chlorination stage is a fluidized chlorinator with a multipoint gas entry and bed overflow opening.

The solids are passed from the preheater to the chlorinator and then after reaction flow on to the next chlorination stage. The gaseous products of chlorination leave overhead and are condensed in a scrubbed flue to remove the solid ferric chloride for recovery of its chlorine values by oxidation.

The partially beneficiated feed flows to the second chlorinator where it is extensively chlorinated to remove substantially all the aluminum values. These chlorides, including the remaining iron and the titanium and silicon chlorides pass with the gases through a cooling flue. Finely divided iron powder is introduced into these gases in order to reduce any ferric chloride to ferrous chloride. The scrubbed flue cools the gases to a temperature level near the aluminum chloride condensation point. The condensed solids consisting of iron chlorides and any aluminum chloride complexes are removed from the gas stream which then passes to a fluidized bed condenser or other cooler which condenses a portion of the aluminum chloride for recycle to the second chlorination stage. This may be used all or in part as a catalyst for the primary chlorination reaction of alumina with carbon and chlorine.

Following this partial condensation of aluminum chloride, the remainder of the product aluminum chloride is condensed. This condensation takes place in an absorber as the vaporous aluminum chloride complexes with a solid alkali chloride added to the gas stream to form the high boiling aluminum chloride-alkali chloride complex. A packed bed is a convenient variety of equipment to bring the reaction to completion and to provide separation from the liquid complex and the remaining chlorinator gases.

The liquid complex is at an increased temperature due to the heat of condensation and reaction and so the separation of the aluminum chloride from the gases is at a high temperature (i.e. about 400° C.). This and the ionic nature of the complex decrease the impurity level of the chlorides from the gas stream to acceptable levels without a further purification stage for the aluminum chloride complex. Further stripping of impurity chlorides by inert purge may be practiced, if desired, on the chloride complex before it is introduced into the hydrolyser.

The hydrolyser operates with steam and/or water with additional heat added by gas combustion if desired. The high velocity reactor can be a pebble fluidized bed as described in copending application referred to hereinabove which allows sufficient attrition to carry the hydrolysed aluminum chloride product into the gas stream where it is recovered and subjected to slower curing processing in a slowly fluidized alumina bed with higher retention time where the desired alumina properties may be developed. Following this the alumina is separated from the sodium chloride by elutriation and washing to remove the chloride. The alkali chloride is recycled.

Gases from the aluminum chloride complexing stage can be treated in conventional chloride technology manner to separate the desired by-products, e.g.: titanium tetrachloride and silicon tetrachloride if desired. Otherwise the chlorides are hydrolysed and the chlorine values recovered as hydrochloric acid. Alternatively the oxidizable chlorides may be fed directly to an oxidizer to recover chlorine values.

The gaseous hydrogen chloride is fed to a dissolver where it is dissolved in water to make hydrochloric acid. This stream, combined with other impure and more dilute streams of hydrochloric acid recovered from various plant scrubbing streams and make-up hydrochloric acid is reacted with ferric oxide and an alkali chloride is added. The resulting solution is dehydrated.

The gaseous hydrogen chloride from the aluminum chloride hydrolyser is absorbed in water to make hydrochloric acid and combined with other hydrochloric acid dissolves ferric oxide fed to a dissolving tank. The solution and solids are pumped from the tank to be separated in a multiclone. The solution of ferric chloride and sodium or potassium chloride is dehydrated and the anhydrous sodium tetrachloro ferrate is fed under pressure to the oxidizer where it is converted to chlorine, ferric oxide and alkali chloride. The latter two materials are recycled to the dissolver while the chlorine is recycled to the chlorinators. Ferric chloride from both chlorinators may be fed directly to the oxidizer. HCl scrubbed from tail gas streams of both reactors, principally from the first chlorination stage, can be recycled to the dissolver. Similarly, salt and salt solutions are recycled from the alumina hydrolysis products to the dissolver.

Flues cool the oxidizer product gases to easily handled temperatures (i.e. below about 80° C.) before separation of the solids from the chlorine. The oxidizer operates under pressure so that the chlorine recycled need not be pressurized for recycle to the chlorinators.

The following examples demonstrate various stages of the process from the preparation of the aluminous feed to the chlorination and recovery of the metal chloride product and by-products and the recovery of chlorine values from the hydrolysis stages of the process.

EXAMPLE I

Bauxite is prepared for chlorination by kiln drying to remove free moisture and about half of the combined water before being subjected to a fluidized bed ignition at 1000° K. which removes combined water (as hydroxyls) leaving less than 1.5% LOI by weight. Surface area change is modest by allowing this amount of water to remain.

After igniting to 1000° K., the feed has an analysis shown in Table III. After cooling and separation from the carbon used for the water removal, the ore is stored for use in demonstrating partial chlorination conditions.

Feed to a preheater of 5.5' ID, refractory lined with an overflow pipe to the first chlorinator is a mixture of coke and ignited bauxite. This mixture, containing approximately 12.5% by weight, is preheated to allow heat balance in the chlorination stage which follows. The preheating gaseous mixture is made up of air and oxygen with an $O_2/N_2$ ratio not exceeding 40/60 to avoid sintering the bed. The fluidization is maintained above that of the succeeding stage to minimize dusting in the chlorinator. Velocities are given in Table I.

After bringing partial beds of feed and coke to the coke ignition temperature, feed is started into the preheater, and when its overflow level is reached, feed flows into the chlorinator. The chlorinator is of the same diameter as the preheater, also refractory lined, but with a much higher gas space above the fluidized bed. Both reactors have multipoint gas distribution and exit gas pressure regulation of the cooled gases. The overflow from the preheater is transferred from the preheater to the chlorinator through an isolating small fluidized bed which keeps the gas flows separated while solids can flow from the preheater to the chlorinator. Pressure balancing of the two exit gas streams by automatic valving allows holding a differential pressure of a fraction of a pound, less than the transfer leg fluidized pressure drop.

When solids overflow the 1st chlorinator, chlorine is substituted for the air/oxygen fluidizing gas and the temperature brought to and held at the operating temperature shown in Table 1. Solids which have been reacted overflow the bed into a fluidized cooler which is watercooled and fluidized with air at a temperature below 400° C. The partially cooled solids are then transported by pipe to a storage bin where they are collected and when completely cook, processed to provide feed for Example II. The gases leaving the 1st chlorination consist of ferric chloride, carbon dioxide and nitrogen and hydrogen chloride. Chlorine feed levels are kept low enough to prevent chlorination of the titanium, aluminum and silicon oxides. Ferrous chloride is avoided by holding a low temperature in the reactor although there is no greater disadvantage in a part of the iron chloride by-product being in the ferrous state.

The leaving gases pass through a 4" water cooled stainless steel flue horizontally disposed and scrubbed with sand. Following the stainless steel flue section of 60', which is water cooled, the gases enter a vertically disposed flue of 5" mild steel also water cooled and after traversing some 120' emerge at a temperature below 100° C. with the ferric chloride as a fine solid. The heavy scrubbing solids are captured in a cyclone from which the finer ferric chloride is elutriated and collected by a second cyclone stage. The HCl is scrubbed from the combustion gases with hydrochloric acid solution.

EXAMPLE II

To demonstrate the second chlorination stage, which is a nearly total chlorination of the beneficiated feed from the first stage, and two reactors previously described are used with a feed prepared as described above. Beneficiated feed is recombined with coke and fed into the preheater where it is reheated. After bringing the preheater and chlorinator to temperature, solid flows are started and when overflow from the chlorinator begins, chlorine feed replaces the air and inert gas feed. Operating conditions are given in Table II for the preheater and chlorinator. Gas concentrations of oxygen and air are varied to hold operating temperatures. Reactor top pressures are balanced with a 0.3 lb. differential to give gas stream isolation as in the previous example.

A bed overflow from the second reactor keeps the concentrations stable and allows sampling under easy conditions. The overflow stream is cooled as in the previous example.

The gaseous chloride product from the chlorinator is reduced by addition of LPG above the bed. This reacts to convert chlorine breakthrough from the bed to HCl and to reduce all the ferric chloride to ferrous chloride which is condensed in the scrubbed flue and removed from the gas stream with the dust and carbon by the cyclone.

The chlorinator gases are cooled by a water cooled scrubbed horizontal stainless flue 4" in diameter followed by a vertical 5" mild steel flue, also water cooled and scrubbed, which lowers the gas temperature to a temperature near but above 440° K. Variable water cooling of the last portion of the flue is used to adjust the exit gas temperature. The gases are cycloned to remove condensed chlorides and the scrubbing solids. They pass immediately to a fluidized bed condenser fluidized at a velocity of about 2'/sec. The condenser is water cooled by a water jacket around the sides of the reactor. The temperature is closely controlled by the cooling water flow rate. The flow rate is regulated so that the condenser removes about 3.5 lbs./min. of solids ($AlCl_3$) as a middling product cut to remove any impurities carried over from the solid condensation products of the flue. The condensed $AlCl_3$ middling cut is collected above the bed by a cyclone kept at a temperature slightly above that of the bed to avoid further condensation. The surface condensed aluminum chloride is abraded from the ballotini surface by the high fluidization velocities.

The uncondensed gases and the tail-gas passing from the cyclone are mixed with salt to begin complex formation. The mixture is passed downwardly and cocurrently over a 1" Raschig ring packed bed in a 2' dia. 5' long contacting column and are separated from the gases at the bottom. The gases are further cooled and water scrubbed before being released to the atmosphere. The molten salt complex is sent to the hydrolyser through a standpipe which allows the hydrolyser to run at an elevated pressure.

The hydrolyser is a 15" ID refractory-lined reactor with a fluidized bed of tabular alumina pebbles fluidized at approximately 10'/sec. The fluidization at the bottom of the 60° cone is by steam. The molten complex is injected at the top of the cone. Before reaction the bed is brought to the operating temperature (950° K.) by a gas-oxygen enriched air mixture which is reduced or cut off as the molten complex is reacted with steam to hydrolyse it. The hydrolysis product is abraded from the pebble surface and collected overhead by a cyclone. This product consists of two solids, sodium chloride with traces of aluminum chloride in solid solution and the product alumina. This product is collected and stripped of interstitial HCl before being quenched in water to remove the sodium chloride.

Operating conditions and feed/product flow rates are shown in Table II.

DISCUSSION OF THE EXAMPLES

The foregoing examples are presented not in limitation of the claims of this invention but as a demonstration of the concepts of the overall process. The hydrogen chloride from the hydrolysis of the aluminum chloride complex can be combined with other sources of hydrogen chloride, hydrochloric acid and ferric chloride containing solutions to be converted into chlorine for recycle to the process by the method of U.S. Pat. No. 3,887,694 wherein a solution of hydrochloric acid is reacted with ferric oxide and sodium chloride to form a solution which upon dehydration will form the complex $NaFeCl_4$ as described in U.S. Pat. No. 3,729,543 and which can then be oxidized to produce chlorine and solid products NaCl and $Fe_2O_3$ for recycle through the hydrochloric acid dissolution step previously referred to.

Although the examples are simplified to demonstrate only the basic steps of the process, it will be recognized by those skilled in the art that the recycle of the "middling" cut of the second chlorinator condensation consisting of aluminum chloride and iron chloride complex with aluminum chlorine can be recycled to the second chlorinator, either to the gas space or to the entering chlorine stream below the bed. In the latter case catalytic benefits accrue although heat is needed to vaporize the recycled aluminum chloride.

It will also be evident that ferric chloride from the first chlorination stage can be introduced into the oxidation reactor in order to convert it to chlorine and ferric oxide. In this case, the sodium chloride present instantly combines with the ferric chloride to form the complex NaFeCl$_4$. This procedure obviates the solution of ferric chloride and subsequent dehydration of its alkali chloride complex. However, if, for convenience, it is desired to add the ferric chloride to the solution, this will, upon dehydration, produce the complex, provided, of course, that the stoichiometric amount of alkali chloride is also added to combine with the additional ferric chloride.

The direct oxidation of ferric chloride above the first chlorinator bed may also be practiced as described in U.S. Pat. No. 3,865,920.

In order to avoid the contamination of the aluminum chloride with iron chloride as a low boiling complex, the reduction of ferric chloride to ferrous chloride is proposed. This reduction may be accomplished in a number of ways. Of particular interest in this process, which alone is capable of recovering hydrogen chloride, is the reduction of ferric chloride with hydrogen for the production of a hydrogen containing gas which does not contain oxygen.

With the use of deep fluidized beds it is possible to operate with a deficiency of chlorine so that some or all of the iron chloride produced is in the ferrous state. Although there are heat balance and possibly other disadvantages in operating with a high percentage of iron chloride products as ferrous chloride, operation at a point where the chlorine breaking through the bed is negligible is advantageous in reducing the amount of hydrogen needed to clean up this chlorine before the ferric chloride can be reduced.

The possible use of hydrogen as a reducing agent is peculiar to an hydrolysis process where hydrogen chloride can be converted to chlorine to avoid an otherwise unbearable economic penalty. The examples have been arranged to show the similar advantage of restraint in dehydration to enable surface area to be preserved through allowing lower chlorination temperatures. Although in the prior art there are indications that chlorination can take place at lower temperatures even than proposed here, in aluminous feeds which retain moisture and hydroxyls to temperatures where surface loss is severe, the benefits of low temperature chlorination stages may be lost through chlorine degradation to HCl. A hydrolysis process will allow the benefits of the low temperatures of chlorination without the concomitant loss of chlorine.

In aluminous feeds of high silica content, such as kaolinite, there are prior art references to selective chlorination. The examples given have employed a second chlorination stage overflow Where selective chlorination can be achieved, the overflow may be further processed to remove the unchlorinated impurity silica and silicates, or discarded if the alumina recovery is at an economic optimum. Otherwise, the overflow may be recycled directly to retain alumina values. This is not shown in the example II since recycle introduces a complexity in demonstrating the basic concepts of the process.

Similarly, in the dissolution of ferric oxide to capture the hydrochloric acid it is desirable to maintain a high ferric oxide level in the solution to improve the reaction kinetics. It is not necessary to remove the ferric oxide before the solution is dehydrated, nor to remove it from the dehydrated complex before introduction to the oxidizer. But the simplicity of solid-liquid separation before dehydration makes operation at high ferric oxide levels attractive.

It is also noted that the low operating temperature of the oxidizer improves the solubility characteristics of oxide dissolution, reducing not only the ferric oxide excess needed in solution but reducing the size of the dissolution reactor necessary.

The examples have chosen operating conditions generally in the midst of the desirable range. The operating areas will vary with the nature of the aluminous feed treated and their exact determination is within the skill of the art once the process described herein is known. The amount of "middling" cut of aluminum chloride to be recycled will be dependent upon the effectiveness of impurity complex separation by the upstream solid condensate cyclone. The amount of recycle is not critical to the process, but will bring heat balance disadvantages if it is excessive.

The examples have not shown heat recovery from the various process stages. Simplicity of equipment is sought to demonstrate the practice of this invention. It will be obvious to those skilled in the art that heat recoveries at high potential are possible by employment of state of the art heat recovery equipment. The economics of such measures is becoming more compelling as time passes although to date even the highly developed titanium pigment processes have not been employing such scavenging techniques. The process of this invention should not be considered to be limited to the equipment concepts used in the demonstration of the process concepts.

TABLE I

| OPERATING CONDITIONS - EXAMPLE I | | |
|---|---|---|
| | Preheater | 1st Chlorinator |
| Temperature | 1000° K. | 1125° K. |
| Pressure | 20 psia | 19.7 psia |
| Velocity | .75'/sec. | .4'/sec. |
| Bed Depth (static) | 24" | 24" |
| Ore Feed | | |
| 1000° ignited | 160 lbs./min. | Overflow from preheater |
| Carbon Feed | 22.5 lbs./min. | Approx. 19% by wt. in overflow |
| Gas Feed | | |
| Chlorine | — | 167 scfm |
| O$_2$/N$_2$ | 40/60<br>395 scfm | 20 scfm, O$_2$/N$_2$ As needed for heat bal. |

TABLE II

| OPERATING CONDITIONS - EXAMPLE II | | |
|---|---|---|
| | Preheater | 1st Chlorinator |
| Temperature | 1200° K. | 1200° K. |
| Pressure | 20.0 psia | 19.7 psia |
| Velocity | .33'/sec. | .4'/sec. |
| Bed Depth (static) | 24" | 30" |
| Ore Feed | | |
| (1st Chlor. Product) | 17 lbs./min. | Overflow |
| Carbon Feed | 5.0 lbs./min. | Overflow |
| Gas Feed | | |
| Chlorine | | 60 scfm |
| O$_2$/N$_2$ | Air<br>150 scfm | 40/60<br>12 scfm |
| % C in Bed | | 20 |
| Solids Overflow (Includes Dusting) | | |
| Ore | | 1.6 lbs./min. |

TABLE II-continued

OPERATING CONDITIONS - EXAMPLE II

|  | Preheater | 1st Chlorinator |
|---|---|---|
| Carbon |  | .33 |

Note:
Pressure is top pressure, over bed.
Bed depth is static bed level.
Ore - 1st Chlor. product.
Carbon Great Lakes Petroleum Coke, 8 × 44 mesh.

TABLE III

FEED AND PRODUCT ANALYSES

|  | "As Received" | | "Kiln Predried" | | "Ignited 1000° K." | | "1st Chlor. Product" | |
|---|---|---|---|---|---|---|---|---|
|  | Wt. % | Mols Wet CWT | Wt. % | Mols CWT | Wt. % | Mols CWT | Wt. % | Mols CWT |
| $Al_2O_3$ | 44.77 | .4341 | 64.68 | .6343 | 77.17 | .7570 | 88.53 | .868 |
| $SiO_2$ | 2.90 | .0483 | 4.19 | .0697 | 5.00 | .0830 | 5.74 | .096 |
| $TiO_2$ | 1.24 | .0155 | 1.79 | .0224 | 2.14 | .0270 | 2.46 | .031 |
| $Fe_2O_3$ | 8.29 | .0519 | 11.98 | .0750 | 14.29 | .0895 | 3.28 | .021 |
| LOI | 24.04 | 1.3356 | 17.36 | .9647 | 1.42 | .0790 |  |  |
| $H_2O_1$ | 18.75 | 1.0417 |  |  |  |  |  |  |

What is claimed is:

1. A method for producing alumina from a material containing alumina, titania, silica and iron values via a chlorination step which process comprises the steps of:
    (A) dehydrating the material at a temperature of between about 500° and 1300° K.;
    (B) chlorinating the product of step (A) in the presence of chlorine and carbon at a temperature below about 1200° K. and under conditions which provide chlorination of a majority of the iron present in the material without substantial chlorination of titania values present therein with concommitant formation of an iron chloride cloud above the surface of the chlorination reaction mixture;
    (C) introducing oxygen into the iron chloride cloud under conditions to cause oxidation of a majority of the iron chloride contained in the cloud;
    (D) chlorinating the non-gaseous product of step (B) in the presence of chlorine and carbon at a temperature above about 1300° K. but below the fusion temperature of silica containing components and under conditions sufficient to chlorinate substantially entirely the alumina, titania and silica values contained therein;
    (E) reducing and condensing any iron chloride contained with the aluminum chloride in one or more partial iron chloride condensation stages;
    (F) absorbing the aluminum chloride under high temperature conditions with an alkali chloride or mixture of alkali chlorides to form an ionic alkali metal aluminum chloride complex;
    (G) selectively condensing any impurity chlorides contained in the product of step (F) to produce a purified aluminum chloride-alkali chloride complex;
    (H) hydrolysing the alkali metal/aluminum chloride complex with steam to produce alumina and hydrochloric acid.

2. The method of claim 1 further comprising the steps of:
    (A) reacting the hydrochloric acid with ferric oxide to form aqueous ferric chloride;
    (B) dehydrating the aqueous ferric chloride of step (A) in the presence of an alkali chloride to form alkali metal tetrachloroferrate; and
    (C) oxidizing the alkali metal tetrachloroferrate to produce chlorine gas.

* * * * *